(12) United States Patent
Errico et al.

(10) Patent No.: US 11,557,891 B2
(45) Date of Patent: Jan. 17, 2023

(54) OVERCURRENT DETECTION CIRCUIT, CORRESPONDING SYSTEM AND METHOD

(71) Applicant: STMicroelectronics S.r.l., Agrate Brianza (IT)

(72) Inventors: Nicola Errico, Rho (IT); Antonio Giordano, Milan (IT); Orazio Pennisi, Pieve Emanuele (IT); Leonardo Pedone, Civitanova Marche (IT); Luca Finazzi, Bergamo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 17/454,228

(22) Filed: Nov. 9, 2021

(65) Prior Publication Data

US 2022/0190585 A1 Jun. 16, 2022

(30) Foreign Application Priority Data

Dec. 10, 2020 (IT) .......................... 102020000030407

(51) Int. Cl.
*H02H 3/087* (2006.01)
*B60R 16/03* (2006.01)

(52) U.S. Cl.
CPC .............. *H02H 3/087* (2013.01); *B60R 16/03* (2013.01)

(58) Field of Classification Search
CPC .......... H02H 3/025; H02H 3/08; H02H 3/087; H02H 3/093; B60R 16/03
See application file for complete search history.

(56) References Cited

U.S. PATENT DOCUMENTS

| | | | | |
|---|---|---|---|---|
| 2007/0146951 A1* | 6/2007 | Takahashi | .............. | H02H 3/087 361/93.1 |
| 2017/0288662 A1* | 10/2017 | Djelassi | ........... | H03K 17/08122 |
| 2018/0366938 A1 | 12/2018 | Bolanos et al. | | |
| 2020/0381913 A1 | 12/2020 | Harada et al. | | |
| 2022/0060011 A1* | 2/2022 | Yousef | ..................... | H02H 3/08 |

OTHER PUBLICATIONS

EP 20191585.7. Aug. 18, 2020. (Year: 2020).*

* cited by examiner

*Primary Examiner* — Jared Fureman
*Assistant Examiner* — Christopher J Clark
(74) *Attorney, Agent, or Firm* — Slater Matsil, LLP (57) ABSTRACT

A circuit includes comparator circuitry to sense a current through a load and compare the intensity of the current with a comparison threshold which can be set to a first, lower threshold value and a second, higher threshold value. Logic circuitry receives from the comparator circuitry a comparison signal having a first value or a second value based on whether the intensity is lower or higher than the comparison threshold. The logic circuitry is configured to assert a first overcurrent event signal or a second overcurrent event signal based on the comparison signal having the first value or the second value and the comparison threshold set to the first or second threshold value.

20 Claims, 4 Drawing Sheets

OVERCURRENT DETECTION CIRCUIT, CORRESPONDING SYSTEM AND METHOD

CROSS-REFERENCE TO RELATED APPLICATIONS

This application claims the benefit of Italian Patent Application No. IT 102020000030407 filed on Dec. 10, 2020, which application is hereby incorporated by reference herein in its entirety.

TECHNICAL FIELD

The present disclosure generally relates to overcurrent detection and, in particular embodiments, to an integrated circuit used, for example, in automotive applications such as transmission and braking control units and other safety features of motor vehicles.

BACKGROUND

Drivers with high current capability, such as Low-Side (LS) and High-Side (HS) drivers for Engine Management System (EMS) applications, can be used in the automotive sector to drive electrical loads such as $O_2$ heaters and other (e.g., solenoid) loads.

Desired features of these drivers involve protection against short-circuits (briefly "shorts") to supply or ground (GND) and an ability to distinguish between a resistive or "soft" short, which generally derives from some load malfunctioning, and a "hard" short, which indicates a real short-circuit occurring at vehicle chassis level.

Various conventional solutions implement two distinct diagnostic circuits to detect the two different types of faults (soft short and hard short, respectively).

SUMMARY

An object of one or more embodiments is to address the previously outlined issues while avoiding the added complexity and cost of using two distinct circuits for soft shorts and hard shorts.

According to one or more embodiments, such an object can be achieved by a circuit with the features set forth in the following claims.

One or more embodiments may relate to a corresponding system. A drive system for use in the automotive sector may be exemplary of such a system.

One or more embodiments may relate to a corresponding method.

The claims are an integral part of the technical teaching provided herein in respect of the embodiments.

One or more embodiments facilitate distinguishing between different overcurrent scenarios (soft and hard shorts), resorting to a single comparator and digital processing of the signal from the comparator, with the possibility of achieving filter time configurability to adapt different types of loads.

One or more embodiments include a single comparator, and digital processing of the resulting signal is implemented to distinguish different short(-circuit) scenarios, with the threshold of the comparator initially set to a first, lower value. In response to this value being exceeded, the threshold is changed to a second, higher value. A short condition can thus be classified as "soft" or "hard" as a function of whether (also) the second is exceeded.

One or more embodiments may rely on implementing a digital code capable of managing and processing information provided by a single analog comparator for both soft and hard overcurrent (short-circuit) events.

One or more embodiments may advantageously provide high configurability of a filter time underlying the fault detection action.

Filter configurability facilitates adaptation to a wide range of load types in providing reliable information to a controller circuit such as a Microcontroller Unit or MCU.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is included in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The headings and references used herein are provided merely for convenience and hence do not define the extent of protection or the scope of the embodiments.

Figure 1:
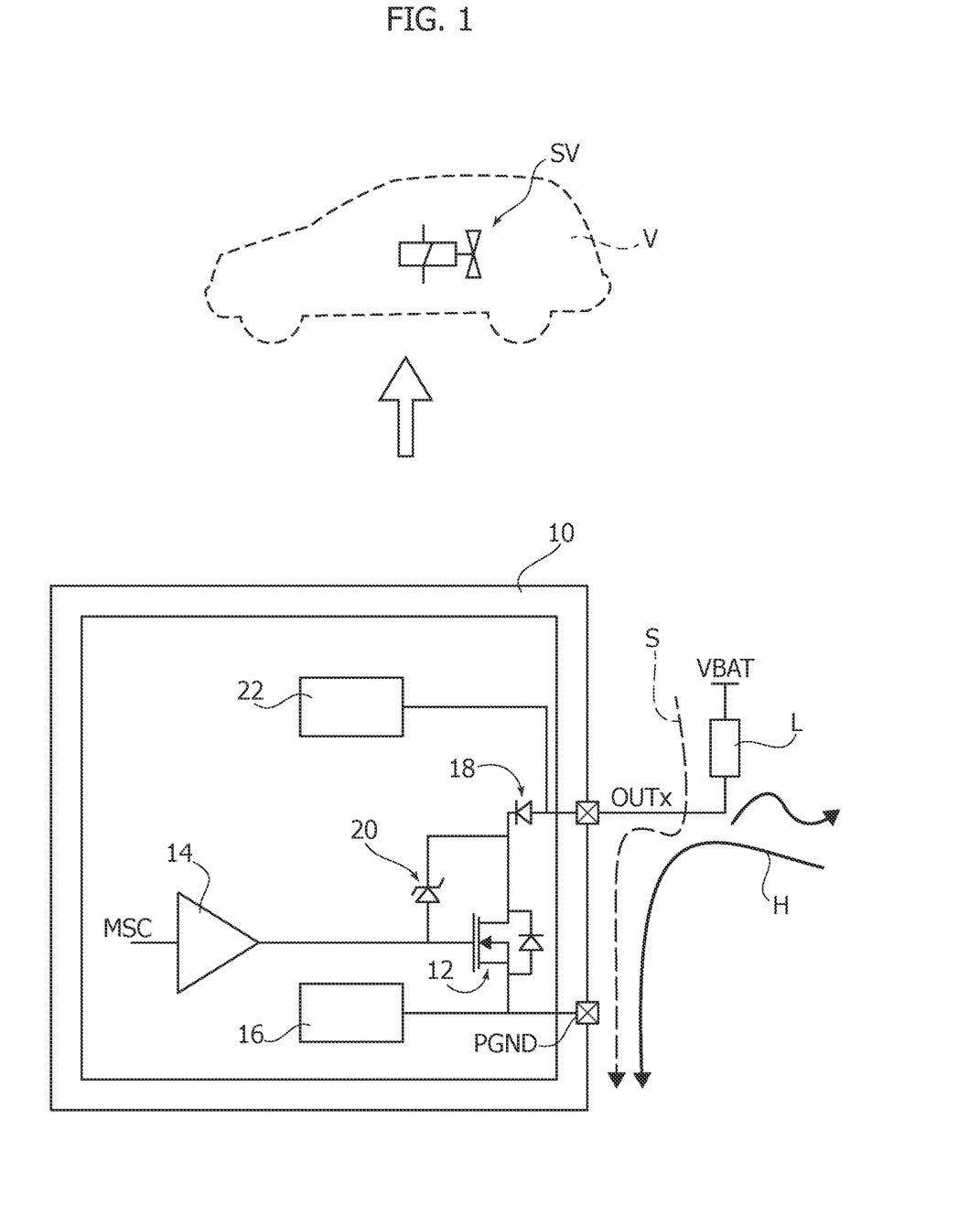
FIG. 1 is illustrative of a possible context of application of embodiments.

In FIG. 1, reference 10 denotes as a whole a circuit configured to control current supply to an electrical load L coupled between a supply voltage VBAT and an output node OUTx of the circuit 10.

In the illustrative representation of FIG. 1, such control action is performed by a power component 12 such as an electronic switch (e.g., a power MOSFET transistor) having a current path therethrough (source-drain, in the case of a field-effect transistor such as a MOSFET) providing a current flow line between the node OUTx and a ground node PGND.

In the illustrative representation of FIG. 1, the electronic switch 12 has a control terminal (a gate, in the case of a field-effect transistor such as a MOSFET) coupled to a (pre)driver stage 14. The stage 14 is configured to make switch 12 alternatively conductive and non-conductive, thus controlling current flow through the load L as a function of a command signal MSC from a master system controller (not visible in the figure).

A circuit 10, as illustrated by way of example in FIG. 1, may include additional circuitry such as ground loss detection circuitry 16 coupled to the ground node PGND of the circuit 10 as well a reverse-current protection diode 18 arranged at the output node OUTx and a Zener diode 20 coupled across the gate and the terminal of the MOSFET 12 coupled to the output node OUTx via the diode 18.

Except for the features discussed in the following, a circuit layout, as illustrated by way of example in FIG. 1, is conventional in the art, making it unnecessary to provide a more detailed description.

Block 22 in FIG. 1 denotes diagnostic circuitry configured to provide various detection and protection functions both in an ON state and in an OFF state of circuit 10, including overcurrent detection as discussed in the following.

The representation of FIG. 1 may correspond, for instance, to LS (Low-Side) and HS (High-Side) drivers used to drive electrical loads used in EMS (Engine Management Systems) in the automotive sector. Such a load is exemplified in FIG. 1 by a solenoid valve SV mounted on-board a vehicle V.

It will be otherwise understood that reference to such a possible application is purely exemplary and non-limiting of the embodiments. One or more embodiments can be generally applied to all types of circuits where the capability of detecting and protecting a circuit (such as an integrated circuit or IC, for instance) against overcurrent (OVC) events is a desirable feature: LS drivers or HS drivers as discussed previously are thus just exemplary of these possible applications.

It is noted that loads having a high current capability—for instance, merely by way of example, $O_2$ heater ($O_2H$), camshaft or solenoid loads as used in engine management systems in the automotive sector—may suffer from degradation during their lifetime due to the high amount of current flowing through them.

For that reason, a desirable feature of protection against short (circuits) is the ability to distinguish between:

a "hard" short (H, full line in FIG. 1): this generally indicates a fault resulting in the output of the driver being directly shorted to ground or battery, with a very high current flow, which is limited only by the "on" resistance of the power switch 12 (MOSFET) and the parasitic resistance of the associated cabling, and a "soft" short (S, dashed line in FIG. 1), which generally indicates a degradation or malfunction of the load and results in a current higher than the load capability flowing through the load L, limited by the degraded resistivity of the load.

Figure 2:
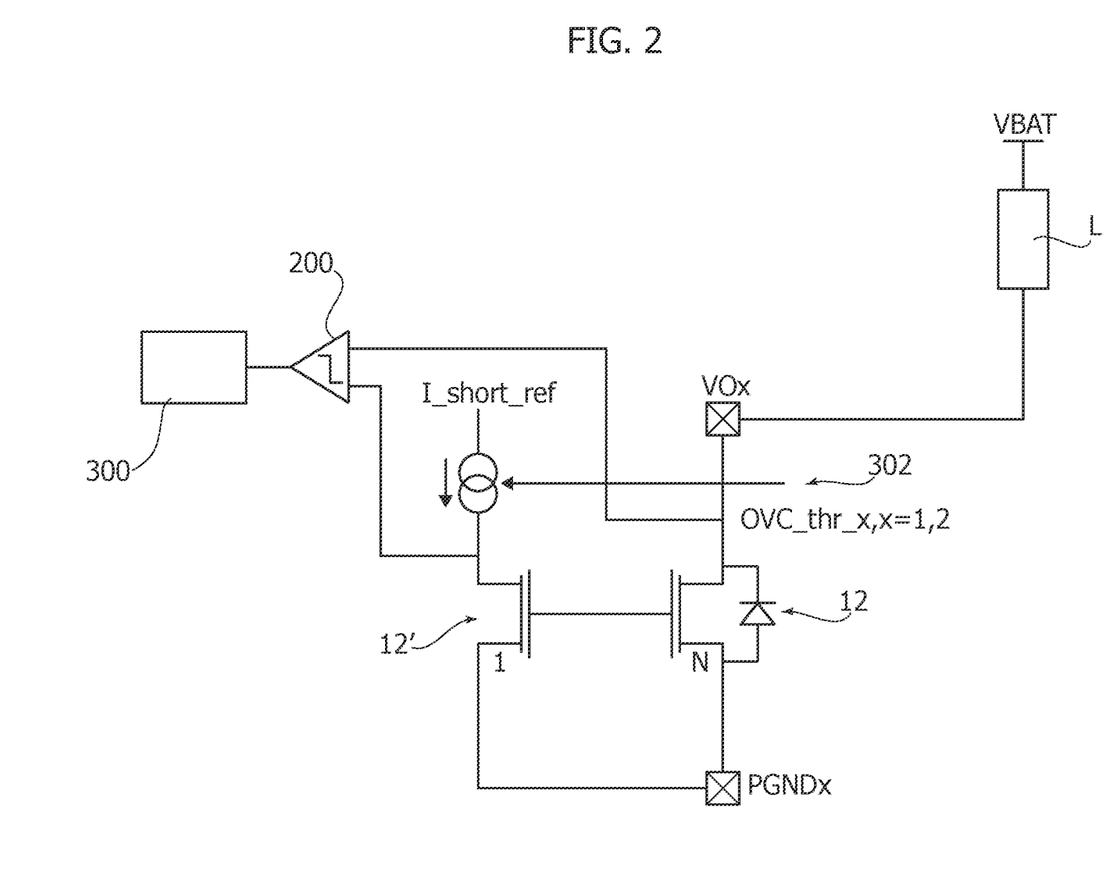
FIG. 2 is a circuit diagram of an embodiment implementation of analog circuitry, which may be used in short fault diagnosis in embodiments according to the present description.

Conventional solutions for short fault diagnosis contemplate—duplicating—distinctly for soft and hard shorts—circuit architecture as exemplified in FIG. 2.

In such architecture (which may be included in block 22 of FIG. 1), a short fault is detected by a comparator 200, which compares the voltage drop VOx-PGNDx across the power switch (the $V_{DS}$ of a power MOSFET 12, for instance) with a reference voltage generated via a current through a 1:N current mirror replica of the power MOS (see 12' in FIG. 2) through which a reference current, I_short_ref=I_short_load/N, is forced.

When the current I_load through the load L (and the power switch 12) is higher than a threshold value I_short_load, a fault is detected. The output of the analog comparator 200 is then managed and filtered by logic circuitry 300 configured to switch-off (make non-conductive) the power switch (and possibly assert a related fault flag on a communication interface to an MCU).

As noted, conventional solutions for short fault diagnosis contemplate—duplicating—distinctly for soft and hard shorts, respectively, circuit architecture as exemplified in FIG. 2.

The whole structure (analog plus digital) is thus replicated with multiplicity 2× for each power switch 12 present in an application (which translates into having 2× sense MOS transistors such as 12', 2× current generators for I_short_ref, 2× comparators 200, and 2× logic circuitry 300) to distinguish between hard and soft shorts.

That is, in such conventional solutions, to comply with specifications as applicable, for instance, to latest-generation ICs for EMS applications, with the capability of distinguishing between hard shorts and soft short both the analog part and the digital part of the detection structure are 2× replicated: a comparator with its dedicated digital management and filter time is thus implemented to detect hard shorts with a higher threshold and shorter filter time, and an additional comparator is implemented with its dedicated digital management to detect soft shorts with a lower threshold and longer filter time.

In applications involving a high multiplicity of drivers in an IC (which is increasingly common in the automotive sector, for instance), the die size impact of full redundancy, as discussed previously, has a remarkable impact on the IC die size.

In addition, a possible lack of correlation between the two comparators and their thresholds (for soft and hard shorts), which may be set close to each other, may lead to potential undesired misdetection of a fault and to difficulty in properly managing the fault and protecting the internal circuit.

Figure 3:
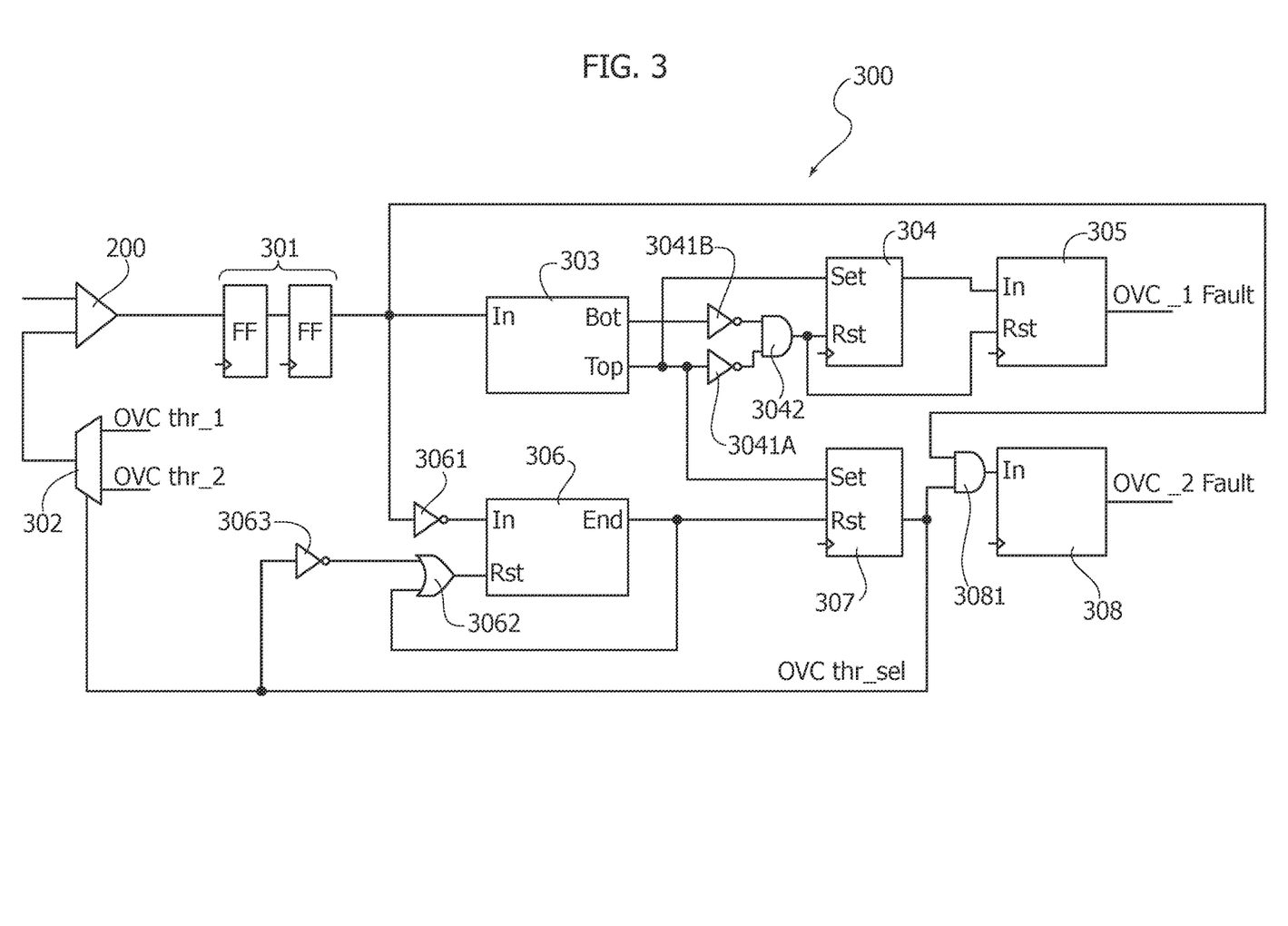
FIG. 3 is a circuit diagram of an embodiment implementation of digital circuitry, which may be used in short fault diagnosis in embodiments according to the present description.

In one or more embodiments, such duplication can be avoided, and a same analog portion as exemplified in FIG. 2 (including only one reference MOS 12', only one configurable reference current generator I_short_ref, and only one comparator 220) can be used for detecting both hard and soft shorts in conjunction with a digital portion 300 as illustrated in FIG. 3 to manage the diagnosis.

Briefly, in one or more embodiments, when the power stage is turned-on (for instance, in a driver such as 10 in FIG. 1), a default threshold can be configured in the reference current generator selected as a lower threshold, able to detect a "soft" short, as a (first) overcurrent threshold (OVC_thr_1).

In case an overcurrent (OVC) event is detected (at the comparator 200), after a short de-glitch filter time implemented with an up-down counter, the logic 300 starts a configurable filter time for the overcurrent fault and in the meanwhile configures the reference current generator to detect a "hard" short, for instance, a short to the battery using a (second), higher overcurrent threshold (OVC_thr_2).

At this point, two different situations (CASE A or CASE B) may arise: CASE A—hard short event: in case of a real short-to-battery fault, the output of the comparator 200 will remain high, and in this case, the logic 300 will start a second, shorter, filter time for the short-to-battery event and assert it if the comparator remains high for the whole up-down counter filter time detecting a short-to-battery event; CASE B—soft short event: in this case, the output from the comparator 200 will go low after changing the threshold to OVC_thr_2, and after a small deglitch filter time the logic 300 will change again the threshold to OVC_thr_1.

If the output from the comparator 200 remains high, the logic 300 will continue to enable the overcurrent filter and set again the threshold to OVC_thr_2. Otherwise, if the comparator goes low, the overcurrent filter will be disabled.

One or more embodiments overcome the drawbacks of conventional duplicated solutions while maintaining the ability to reliably distinguish between hard and soft short events, with increased flexibility in terms of digital filter time configuration.

Considering a multiplicity of N stages (as exemplified in FIG. 1, for instance), in one or more embodiments, only N analog comparators 200 can be implemented in the place of 2×N analog comparators as in the case of conventional "duplicated" solutions. This leads to notable savings in terms of die size, with an increased advantage in the presence of a high multiplicity (a high number N of stages), in so far as overhead in terms of additional die size for digital signal management is negligible. One or more embodiments facilitate avoiding fault misdetection: the thresholds for soft and hard shorts are correlated in so far as they are generated by the same current generator (namely, I_short_ref), checked by a same comparator (namely 200), and managed by the same logic (namely 300).

The block diagram of FIG. 3 is illustrative of a possible implementation of logic circuitry 300 configured to cooperate with the analog comparator 200 and: receive the output from the comparator 200, for instance, via synchronization circuitry 301 (a pair of cascaded flip-flops, for example), and set the threshold of the comparator alternately to either OVC_thr_1 (lower value, for soft shorts) or OVC_thr_2 (higher value, for hard shorts), which may be via a multiplexer 302.

As illustrated in FIG. 3, logic circuitry 300 includes a first Up-Down counter 303, having a first count threshold cnt_thr_1, which receives at an input In the output from the comparator 200 (for instance, via synchronization circuitry 301) and produces top and bottom signals at outputs Top and Bot.

The top signal at the output Top is applied to a Set input of a latch event circuit 304.

The top and bottom signals at the outputs Top and Bot are also supplied via logic inverters 3041A and 3041B to the inputs of an AND gate 3042 whose input is applied to a reset input Rst of a latch event circuit 304.

The output from the latch event circuit 304 is applied to an input In of a first overcurrent filter 305 which receives at a reset input Rst the output signal from the AND gate 3042 and is configured to produce a first overcurrent signal OVC_1 Fault.

As illustrated in FIG. 3, logic circuitry 300 includes a second Up-Down counter 306, having a second count threshold cnt_thr_2, which receives at an input In, via a logic inverter 3061, the output from the comparator 200 and produces an end signal at an End output.

The end signal at the End output of the second Up-Down counter 306 is applied to: a reset input Rst of a further latch event circuit 307 which receives at a Set input the top signal from the first Up-Down counter 303, and one of the inputs of an OR gate 3062 which receives at its other input, via a logic inverter 3065, an output signal OVC_thr_set from the further latch event circuit 307.

The output signal OVC_thr_set from the further latch event circuit 307 is also applied to the multiplexer 302 to facilitate changing the threshold of the comparator 200 between OVC_thr_1 and OVC_thr_2 as discussed in the following.

The output from the further latch event circuit 307 is applied to an input In of a second overcurrent filter 308 via an AND gate 3081, which receives at its inputs the output from the further latch event circuit 307 and the output from the comparator 200 (for instance, via synchronization circuitry 301).

The second overcurrent filter 308 is configured to produce a second overcurrent signal OVC_2 Fault.

In the exemplary implementation illustrated in FIG. 3: the first counter 303 counts up when its input is equal to 1 and down when is equal to 0; the top output Top is set to 1 when the counter is equal to cnt_thr_1, and the bottom output Bot is set to 1 when the counter reaches cnt_thr_1 and is set to 0 when the counter reaches 0; the second counter 306 counts up when its input is equal to 1 and down when is equal to 0; the end output at output End is set to 1 when the counter is equal to cnt_thr_2 and the reset input Rst is an asynchronous reset of the counter when is equal to 1; the output of the latch event circuits 304 and 307 is set to 1 when the Set input is 1 (high priority) and to 0 when reset input Rst is 0 (low priority); the outputs OVC_1 Fault and OVC_2 Fault from the output filters 305 and 308, respectively, is set to 1 if the input is 1 for the programmed filter time.

It is otherwise noted that the implementation of the logic circuitry 300 illustrated in FIG. 3 is merely exemplary: like operation may in fact be facilitated by other implementations which can be devised by those of skill in the art. Also, those of skill in the art will appreciate that, while illustrated as included of individual circuit blocks for the ease of explanation and understanding, such a logic circuitry 300 can be implemented, partly or wholly, in software form.

Figure 4:
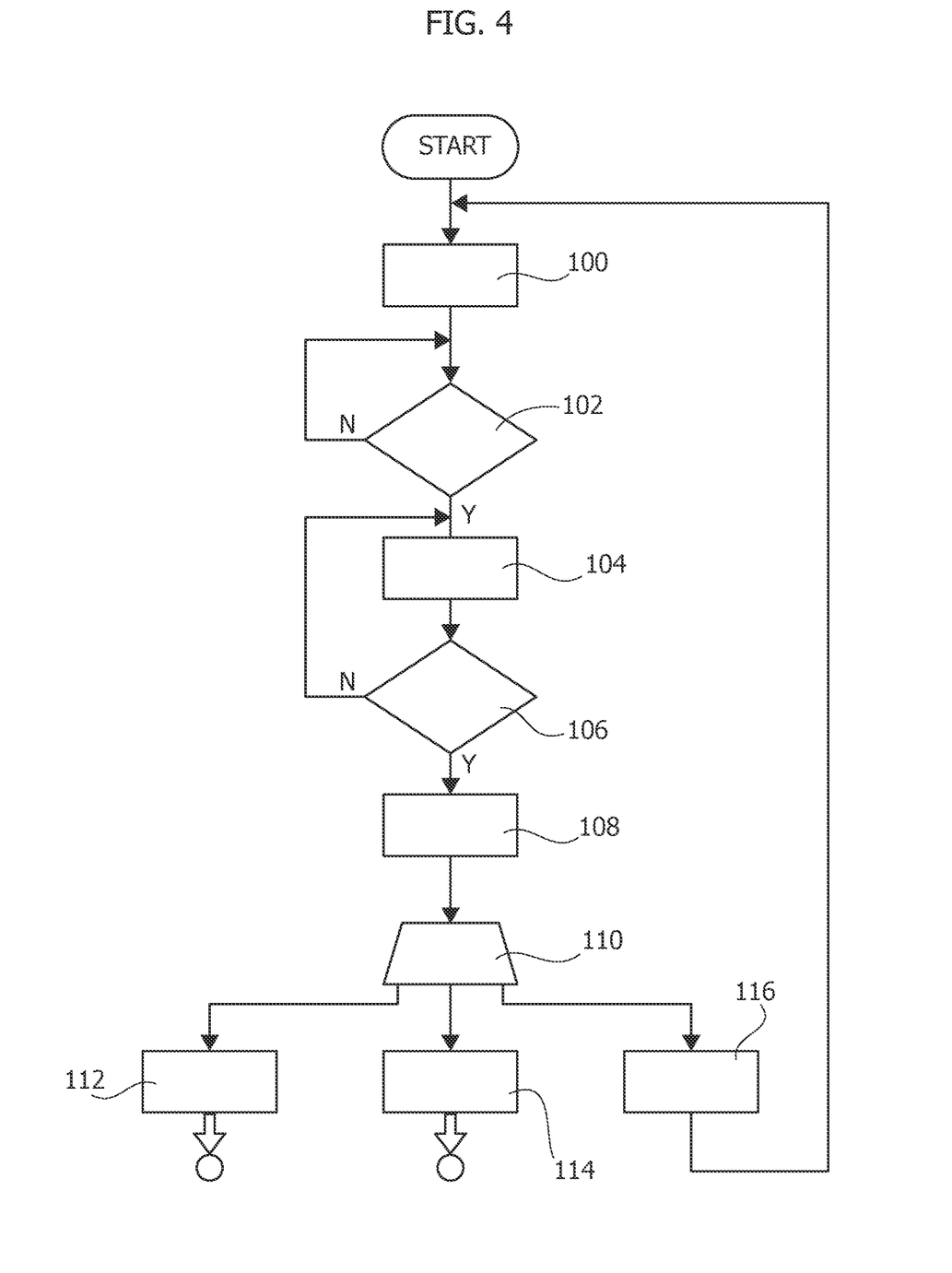
FIG. 4 is a functional flow-chart exemplary of an embodiment operation according to the present description.

FIG. 4 is a functional flow-chart exemplary of the possible operation of embodiments as discussed herein.

At start-up, the OVC threshold of the analog comparator 300 is set to the soft short value OVC_thr_1 (step 100).

If a fault event occurs (positive outcome Y at step 102; if no fault event is detected, system operation merely loops back upstream of clock 102) certain initial steps are taken, which are the same for both soft and hard shorts.

At a step 104 the output from the analog comparator 200 goes to 1, and (after synchronization) this is used to start the first Up_Down counter 303.

When the count in counter 303 reaches the threshold "cnt_thr_1," both the top and bottom signals are set to 1 (step 106).

Then the top signal from counter 303 is used to set both latch event circuits 304 and 307 (step 108).

In response thereto, the latch event circuit 304 is used to start the first time filter 305 to detect a soft short fault, and the latch event circuit 307 is used to change the comparator threshold to the hard short value OVC_thr_2 (step 110).

At this point two scenarios are possible, namely: hard short fault, soft short fault, plus a third scenario indicative of a fault being no longer present.

In the case of hard short fault (as represented by block 112):

the output of the analog comparator 200 remains high also with the (higher) hard short threshold applied; the input of the filter 308 is not masked when the signal OVC_thr_sel is asserted (to 1, for instance) to select the hard short threshold for the comparator 200 so the signal from the comparator 200 is visible; if the comparator remains high for the filter time configured at 308, a hard fault is detected, and the signal OVC_2 Fault is asserted, with actions contemplated in the presence of hard fault taken (power switch 12 turned off, for instance).

In the case of soft short fault (as represented by block 114): the output from the analog comparator 200 is still high when the (higher) hard short threshold is selected (the comparator takes time to re-settle to 0); when the output from the comparator 200 is 0 while the hard short threshold is selected, the second Up-Down counter 306 starts to count; when the second Up-Down counter 306 reaches cnt_thr_2 the threshold of the comparator 200 is switched back to the lower value for soft short; if a soft short is (still) present, the output from the comparator 200 will become high again after a settling time, and the steps discussed above are repeated; a soft fault is detected, and the signal OVC_1 Fault is asserted, with actions contemplated in the presence of soft fault taken if these conditions remain for the filter time set in the filter 305.

While represented distinctly with reference to the blocks 112 and 114 for ease of explanation, the actions contemplated in the presence of a hard short and in the presence of a soft short, respectively, may in fact lead in both instances to turning off the power switch 12 to avoid driver damage.

A distinction between the two types of action may in fact, lie in the different filtering times: a hard short involves a high fault current likely to result in driver damage in a short time (2 microseconds, for instance), while a soft short involves a lower (medium-high) fault current likely to result in driver damage in a longer time (60 microseconds, for instance).

The third scenario represented by block 116 may occur if a fault is found to be no longer present.

In such a scenario:

the output from the analog comparator 200 is still high when the (higher) hard short threshold is selected (the comparator takes time to re-settle to 0); when the output from the comparator 200 is 0 while the hard short threshold is selected, the second Up-Down counter 306 starts to count; when the count in the second Up-Down counter 306 reaches the value cnt_thr_2, the threshold of the comparator 200 is switched back to the lower value for soft short; if a soft short is (no longer) present, the output from the analog comparator 200 remains at 0 and the first Up-Down counter 303 starts to count down. In response to the count in counter 303 reaching 0, both the first latch event circuit 304 and the first filter 305 are reset.

Operation of logic architecture 300 as discussed herein may benefit from configuring the filters 305 and 308 taking into account the settling time of the analog comparator 200.

This may be advantageous when dealing with a possible critical scenario occurring in the presence of a soft short fault with hard short threshold selected. In that case, the output from the analog comparator 200 may go to 0, with the first Up-Down counter 303 starting to count down (from cnt_thr1 to 0) and the second Up-Down counter 308 starting to count up (from 0 to cnt_thr2).

A judicious choice of cnt_thr2 may avoid that this threshold should be unduly high (counting of the counter 306 too long): otherwise, when the threshold is changed back to soft short, the count in the first Up-Down counter 303 will be too low and likely to reach 0 before the analog comparator 200 settles back to 1. This may cause a loop where the threshold of the analog comparator 200 toggles continuously, with no-fault detected.

A judicious choice of cnt_thr1 may likewise avoid that this threshold should be unduly high (counting of the counter 303 too long) as this may affect the final detection time for hard short fault that is equal to the sum of cnt_thr1 and the time OVC_flt2 set for the second filter 308. For instance, cnt_thr1 may be chosen to match the comparator settling time, and so when the comparator 200 sets to 1, the counter is only, e.g., 1 clock cycle away from reset.

Tuning of cnt_thr1 and cnt_thr2 as desired can be based on simulation with a possible fine-tuning in view of the intended application.

In brief, a circuit as exemplified herein may include: comparator circuitry (for instance, 200) configured to be coupled (for instance, at the nodes OUTx, VOx) to an electrical load (for instance, L) and to sense (for instance, at 12, 12') a current through the load, the comparator circuitry configured to compare the intensity of the current sensed with a comparison threshold settable (for instance, at 302) to a first threshold value (for instance, OVC_thr_1) and to a second threshold value (for instance, OVC_thr_2), the second threshold value higher than the first threshold value, logic circuitry (for instance, 300) coupled to the comparator circuitry to receive therefrom a comparison signal having a first value if the intensity of the current sensed is lower than the comparison threshold (for instance, OVC_thr_1 or OVC_thr_2) and a second value if the intensity of the current sensed is higher than the comparison threshold, wherein the logic circuitry includes: threshold setting circuitry (for instance, 302) configured to set the comparison threshold of the comparator circuitry alternately to the first threshold value (for instance, OVC_thr_1) and to the second threshold value (for instance, OVC_thr_2), processing circuitry (for instance, 303 to 308) configured to process the comparison signal from the comparator circuitry, and: assert (for instance, 114) a first overcurrent event signal (for instance, OVC_1_Fault) in response to the comparison signal from the comparator circuitry having the second value with the comparison threshold set to the first threshold value and the first value with the comparison threshold set to the second threshold value (OVC_thr_2), assert (for instance, 112) a second overcurrent event signal (for instance, OVC_2_Fault) in response to the comparison signal from the comparator circuitry (200) having the second value both with the comparison threshold set to the first threshold value and with the comparison threshold set to the second threshold value.

In a circuit, as exemplified herein, the threshold setting circuitry (for instance, 302) may be configured to set the comparison threshold of the comparator circuitry to the second threshold value (for example, OVC_thr_2) in response to the processing circuitry detecting that the comparison signal from the comparator circuitry has the second value with the comparison threshold set to the first threshold value (for instance, OVC_thr_1).

In a circuit, as exemplified herein, the processing circuitry may include: a first-time filter circuit (for instance, 305, 303) configured to assert the first overcurrent event signal in response to the comparison signal from the comparator circuitry having the second value with the comparison threshold set to the first threshold value and the first value with the comparison threshold set to the second threshold value for a first-time interval, a second-time filter circuit (for instance, 308, 306) configured to assert the second overcurrent event signal in response to the comparison signal from the comparator circuitry having the second value both with the comparison threshold set to the first threshold value and with the comparison threshold set to the second threshold value for a second-time interval, wherein the first-time interval is longer than the second-time interval.

In a circuit, as exemplified herein, the processing circuitry may be configured to enable the first-time filter circuit concurrently with the threshold setting circuitry setting the comparison threshold of the comparator circuitry to the second threshold value.

In a circuit, as exemplified herein, the processing circuitry may be configured to assert (for instance, 116) an end-of-overcurrent-event signal in response to the comparison signal from the comparator circuitry having the first value with the comparison threshold set to the second threshold value.

A system as exemplified herein (a drive system for use in the automotive sector may be exemplary of such a system) may include: an electrical load (for instance, L), a driver circuit (for instance, 10) coupled (for instance, at OUTx, VOx) to the electrical load, the driver circuit configured (for instance, via the switch 12) to control current flow through the electrical load, wherein the driver circuit includes a circuit (for instance, 200, 300) as exemplified herein having the comparator circuitry (for instance, 200) coupled (for instance, at OUTx, VOx) to the electrical load to sense (for instance, at 12, 12') the current flowing through the load, wherein the driver circuit may be configured to counter an overcurrent flowing through the load selectively: in a first overcurrent mode (for instance, 114), in response to the first overcurrent event signal (for instance, OVC_1_Fault) being asserted, or in a second overcurrent mode (for instance, 112), in response to the second overcurrent event signal (for instance, OVC_2_Fault) being asserted.

A method of operating a circuit or a system as exemplified herein may include: operating the comparator circuitry (for instance, 200) to compare the intensity of the current sensed with the comparison threshold setting the comparison threshold alternately to the first threshold value (for instance, OVC_thr_1) and to the second threshold value (for instance, OVC_thr_2), detecting assertion of the first overcurrent event signal (for instance, OVC_1_Fault) or the second overcurrent event signal (for instance, OVC_2_Fault) by the processing circuitry (for instance, 303 to 308), declaring a soft short-circuit occurring at the electrical load in response to the first overcurrent event signal (for instance, OVC_1_Fault) asserted, and declaring a hard short-circuit occurring at the electrical load in response to the second overcurrent event signal (for instance, OVC_2_Fault) being asserted.

Without prejudice to the underlying principles, the details and embodiments may vary, even significantly, with respect to what has been described by way of example only, without departing from the extent of protection.

The extent of protection is determined by the annexed claims.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A circuit coupled to a load, the circuit comprising:
   a comparator circuit coupled to the load, the comparator circuit configured to:
   sense a current at the load, and
   compare an intensity of the current with a threshold, the threshold configurable to be set to a first threshold and a second threshold greater than the first threshold;
   a logic circuit coupled to the comparator circuit, the logic circuit configured to receive a comparison signal, the comparison signal having a first value based on the intensity being lower than the threshold, and the comparison signal having a second value based on the intensity being greater than the threshold, the logic circuit comprising:
   a threshold setting circuit configured to set the threshold to one of the first threshold or the second threshold, and
   a processor configured to:
   receive the comparison signal from the comparator circuit;
   assert a first overcurrent event signal based on:
   the comparison signal having the second value in response to the threshold set to the first threshold, and
   the comparison signal having the first value in response to the threshold set to the second threshold; and
   assert a second overcurrent event signal based on:
   the comparison signal having the second value in response to the threshold set to the first threshold, and
   the comparison signal having the second value in response to the threshold set to the second threshold.

2. The circuit of claim 1, wherein the threshold setting circuit is further configured to set the threshold to the second threshold based on the processor determining the comparison signal having the second value in response to the threshold set to the first threshold.

3. The circuit of claim 1, wherein the processor comprises:
   a first-time filter circuit configured to, for a first-time interval, assert the first overcurrent event signal based on:
   the comparison signal having the second value in response to the threshold set to the first threshold, and
   the comparison signal having the first value in response to the threshold set to the second threshold; and
   a second-time filter circuit configured to, for a second-time interval lesser than the first-time interval, assert the second overcurrent event signal based on:
   the comparison signal having the second value in response to the threshold set to the first threshold, and
   the comparison signal having the second value in response to the threshold set to the second threshold.

4. The circuit of claim 3, wherein the processor is configured to enable the first-time filter circuit concurrently with the threshold setting circuit setting the threshold to the second threshold.

5. The circuit of claim 1, wherein the processor is configured to assert an end-of-overcurrent event signal based on the comparison signal having the first value in response to the threshold set to the second threshold.

6. The circuit of claim 1, wherein the comparator circuit is further configured to generate the comparison signal based on the comparing the intensity of the current with the threshold.

7. The circuit of claim 1, wherein the processor is further configured to:
declare a soft short-circuit at the load in response to the asserting of the first overcurrent event signal; and
declare a hard short-circuit at the load in response to the asserting of the second overcurrent event signal.

8. A system, comprising:
a load;
a driver circuit coupled to the load, the driver circuit configured to control a current flowing through the load, the driver circuit comprising:
a circuit coupled to a load, the circuit comprising:
a comparator circuit coupled to the load, the comparator circuit configured to:
sense a current at the load, and
compare an intensity of the current with a threshold, the threshold configurable to be set to a first threshold and a second threshold greater than the first threshold;
a logic circuit coupled to the comparator circuit, the logic circuit configured to receive a comparison signal, the comparison signal having a first value based on the intensity being lower than the threshold, and the comparison signal having a second value based on the intensity being greater than the threshold, the logic circuit comprising:
a threshold setting circuit configured to set the threshold to one of the first threshold or the second threshold, and
a processor configured to:
receive the comparison signal from the comparator circuit;
assert a first overcurrent event signal based on:
the comparison signal having the second value in response to the threshold set to the first threshold, and
the comparison signal having the first value in response to the threshold set to the second threshold; and
assert a second overcurrent event signal based on:
the comparison signal having the second value in response to the threshold set to the first threshold, and
the comparison signal having the second value in response to the threshold set to the second threshold.

9. The system of claim 8, wherein the driver circuit is configured to counter an overcurrent flowing through the load selectively in:
a first overcurrent mode in response to the first overcurrent event signal being asserted, or a second overcurrent mode in response to the second overcurrent event signal being asserted.

10. The system of claim 8, wherein the threshold setting circuit is further configured to set the threshold to the second threshold based on the processor determining the comparison signal having the second value in response to the threshold set to the first threshold.

11. The system of claim 8, wherein the processor comprises:
a first-time filter circuit configured to, for a first-time interval, assert the first overcurrent event signal based on:
the comparison signal having the second value in response to the threshold set to the first threshold, and
the comparison signal having the first value in response to the threshold set to the second threshold; and
a second-time filter circuit configured to, for a second-time interval lesser than the first-time interval, assert the second overcurrent event signal based on:
the comparison signal having the second value in response to the threshold set to the first threshold, and
the comparison signal having the second value in response to the threshold set to the second threshold.

12. The system of claim 11, wherein the processor is configured to enable the first-time filter circuit concurrently with the threshold setting circuit setting the threshold to the second threshold.

13. The system of claim 8, wherein the processor is configured to assert an end-of-overcurrent event signal based on the comparison signal having the first value in response to the threshold set to the second threshold.

14. The system of claim 8, wherein the comparator circuit is further configured to generate the comparison signal based on the comparing the intensity of the current with the threshold.

15. A method, comprising:
sensing, by a comparator circuit, a current at a load;
comparing, by the comparator circuit, an intensity of the current with a threshold, the threshold configurable to be set to a first threshold and a second threshold greater than the first threshold;
receiving, by a logic circuit coupled to the comparator circuit, a comparison signal, the comparison signal having a first value based on the intensity being lower than the threshold, and the comparison signal having a second value based on the intensity being greater than the threshold;
setting, by a threshold setting circuit of the logic circuit, the threshold to one of the first threshold or the second threshold;
receiving, by a processor, the comparison signal from the comparator circuit;
asserting, by the processor, a first overcurrent event signal based on:
the comparison signal having the second value in response to the threshold set to the first threshold, and
the comparison signal having the first value in response to the threshold set to the second threshold; and
asserting, by the processor, a second overcurrent event signal based on:
the comparison signal having the second value in response to the threshold set to the first threshold, and
the comparison signal having the second value in response to the threshold set to the second threshold.

16. The method of claim 15, further comprising:
detecting, by the processor, the assertion of the first overcurrent event signal or the second overcurrent event signal,
declaring a soft short-circuit occurring at the load in response to the first overcurrent event signal being asserted, and
declaring a hard short-circuit occurring at the load in response to the second overcurrent event signal being asserted.

17. The method of claim 15, further comprising setting, by the threshold setting circuit, the threshold to the second threshold based on determining, by the processor, of the comparison signal having the second value in response to the threshold set to the first threshold.

18. The method of claim 15, further comprising asserting, by the processor, an end-of-overcurrent event signal based on the comparison signal having the first value in response to the threshold set to the second threshold.

19. The method of claim 15, further comprising generating, by the comparator circuit, the comparison signal based on the comparing the intensity of the current with the threshold.

20. The method of claim 15, further comprising countering, by a driver circuit, an overcurrent flowing through the load selectively in:
- a first overcurrent mode in response to the first overcurrent event signal being asserted, or
- a second overcurrent mode in response to the second overcurrent event signal being asserted.

* * * * *